June 25, 1940. W. A. TAYLOR 2,205,444
AUXILIARY BUMPER FOR MOTOR VEHICLES
Filed July 1, 1937
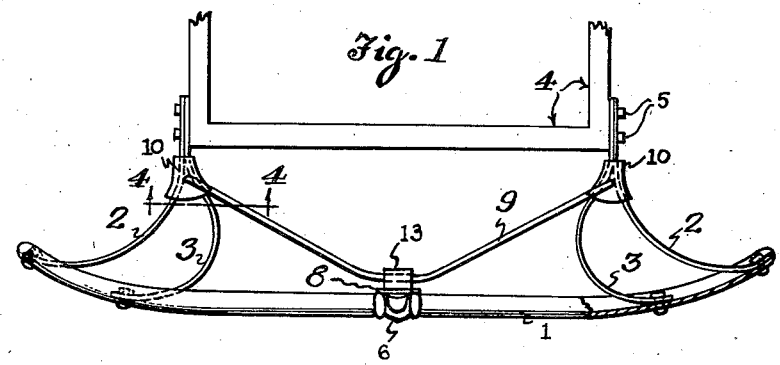
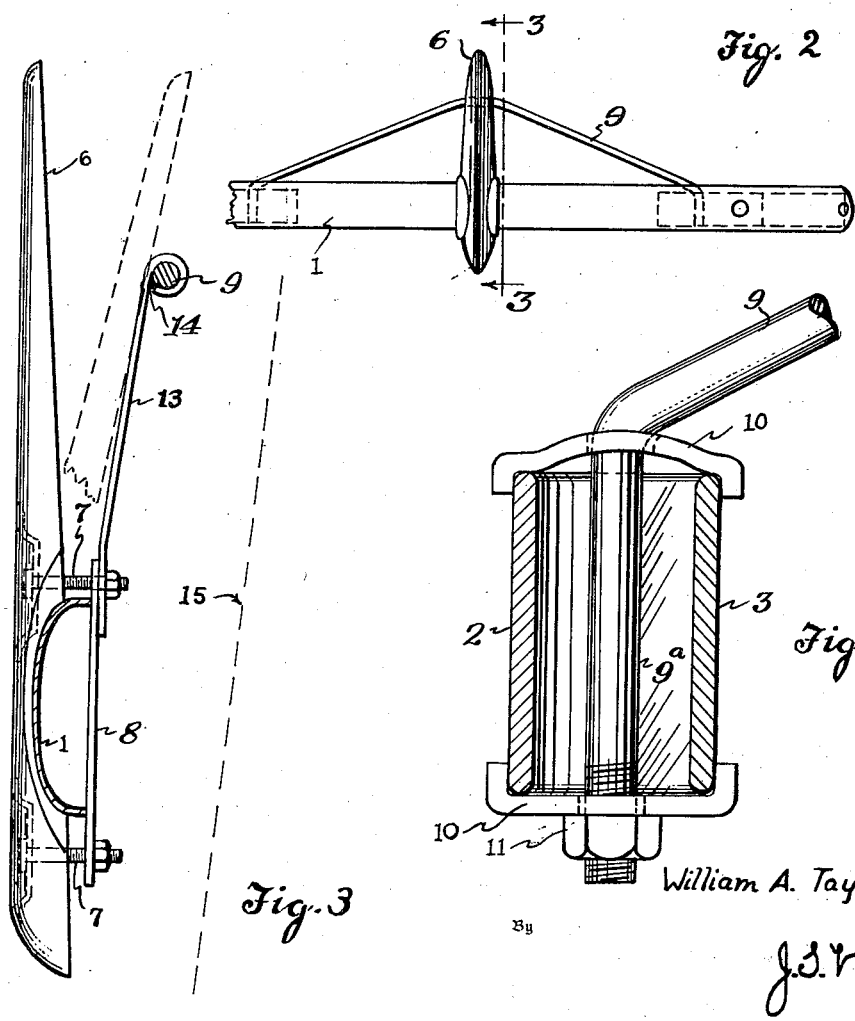
Inventor
William A. Taylor
By
J. S. Murray
Attorney Patented June 25, 1940

2,205,444

UNITED STATES PATENT OFFICE 2,205,444

AUXILIARY BUMPER FOR MOTOR VEHICLES

William A. Taylor, Detroit, Mich.

Application July 1, 1937, Serial No. 151,468

16 Claims. (Cl. 293—55)

This invention relates to motor vehicle bumpers and particularly to devices for limiting the impact movement of such bumpers.

It is common practice to equip a motor vehicle with a grille in front of the radiator and to mount on the mid portion of the front bumper of the vehicle a vertically elongated bar, known as a grille guard, to receive impact of an object, as the bumper of another vehicle, disposed at a higher or lower level than the bumper carrying such guard. In practice, however, it has been found that grille guards in present use fail to accomplish their purpose, due to torsional flexing of the guard-supporting bars, under any considerable impact applied to the upwardly projecting portions of the guards. Also the considerable upward extent of present day grille guards affords a leverage sufficient under heavy impact to deflect or bend the guards against the grilles they are designed to protect.

An object of the invention is to provide an auxiliary bumper engageable by a grille guard on the usual front bumper, upon a predetermined rearward deflection of the guard.

Another object is to employ the supporting arms of the front bumper of a vehicle to further support an auxiliary bumper, limiting rearward deflection of a grille guard carried by the front bumper.

A further object is to reinforce the aforementioned auxiliary bumper by a connection downwardly extending from the impact point of such bumper to the face bar of the main bumper.

A further object is to dispose rearwardly of a grille guard, centrally carried on the front bumper of a motor vehicle, an auxiliary bumper comprising an elongated rod spaced at its mid portion rearwardly from such guard and extending rearwardly and downwardly from its mid portion for attachment to the sides of the vehicle frame.

A further object is to engage each end of the aforementioned rod between a pair of forwardly diverging arms supporting the front bumper, and to restrain such arms from an abnormal increase of their divergence under the rearward thrust imposed by the ends of the rod, when exercising its bumper function.

These and various other objects are attained by the construction hereinafter described and illustrated in the accompanying drawing, wherein:

Fig. 1 is a top plan view of the front bumper of a motor vehicle showing an auxiliary bumper operatively associated therewith.

Fig. 2 is a front view of the same.

Fig. 3 is a vertical sectional view of the same taken on the line 3—3 of Fig. 2.

Fig. 4 is a fragmentary sectional view taken on the line 4—4 of Fig. 1 and showing attachment of the auxiliary bumper to paired supports for the main bumper.

In these views, the reference character 1 designates the usual elongated face bar of a front bumper, such bar being forwardly bowed and preferably of the approximate channel form, illustrated. Each end portion of said bar is engaged at longitudinally spaced points by a pair of curved, resilient, supporting arms 2 and 3 converging at an acute angle as they extend rearwardly, said pairs having their rear ends bolted to opposite sides of the frame 4, as indicated at 5. Centrally secured to the bar 1, is a vertically elongated grille guard 6, projecting to some extent below the bar and a considerable distance thereabove. In the usual practice illustrated, the guard 6 engages and conforms to the front face of the bar 1, being bolted above and below the latter, as indicated at 7, to a clamping plate 8 rearwardly engaging the bar.

To prevent undue rearward deflection of the guard 6, there is provided an auxiliary bumper comprising a rod 9 normally rearwardly spaced, at its mid-portion, from the upper portion of said guard, and extending rearwardly and downwardly from its mid portion in an approximate V form, its ends being downwardly bent, as indicated at 9a, and engaged between the arms 2 and 3 at their juncture. For clamping the rod 9 to the arms 2 and 3, a pair of plates 10 is apertured to engage each end portion 9a respectively above and below said arms and in a bridging relation thereto, and a pair of nuts 11, threaded on the ends of the rod clamp the lower plates 10 against the arms and the upper plates against the converging portions of the rod. To prevent undue spreading apart of the arms 2 and 3 by the end portions 9a when the rod 9 is under impact, it is preferred to conform the lateral edges of each plate 10 to the divergency of the corresponding arms 2 and 3 and to flange such edges to straddle the arms, as best appears in Fig. 4.

When the grille guard 6 is sufficiently deflected under impact to transmit the impact to the rod 9, the latter may tend to swing upwardly or downwardly about its ends, and to counteract such tendency, it is preferred to extend a metal strap 13 from the mid portion of the rod to the face bar 1. In the construction illustrated, as best appears in Fig. 3, the upper end portion of the strap 13 is looped around the rod 9, a weld 14 serving to hold the loop closed, and the lower end of the strap is attached to one of the bolts 7. Thus it is seen that such bolt constitutes a common means for securing the guard 6 and member 13 to the face bar. Fig. 3 also indicates at 15 the front face of a grille, and shows in dash line how the guard 6, when deflected, engages the auxiliary bumper, being thus held away from the grille.

The described auxiliary bumper coacts with the guard 6 to derive from the latter a reel protection for the motor vehicle grille such as has not been heretofore achieved. Normal action of the main bumper under moderate impacts is not impeded by the auxiliary bumper. Under severe blows, however, the auxiliary bumper takes effect to reinforce the main bumper, and will in many instances safeguard the latter from material damage. When the main bumper functions under moderate impacts and independently of the auxiliary bumper, the loop of the strap 13 embracing the rod 9, pivots on the latter to allow a free action.

In further explanation of the inadequacy of grille guards as heretofore installed, it is to be noted that the rearward reflection of a grille guard, resulting from an impact applied to the upwardly projecting portion of the guard, tends to upwardly deflect the bumper bar or other object applying the impact. Resulting upward shifting of the impact point increases the leverage under which the impact acts and hence increases the tendency to further deflect or bend the guard.

While the auxiliary bumper has been described in its adaptation to a certain type of front bumper, it is to be understood that the invention may be adapted by modification to various other types of bumpers and grille guards.

The invention is presented as including all such modifications and changes as come within the scope of the following claims.

What we claim is:

1. In an auxiliary bumper for a motor vehicle, the combination with the frame of such vehicle, a bumper carried by the frame and having a face bar, and a guard member upstanding from the face bar and having a free upper end portion, of an auxiliary bumper mounted on and forwardly projecting from the frame and spaced from the upper portion of the guard member in the direction of normal impact, and engageable by the guard, upon deflection thereof toward the frame, to limit such deflection, and a member extending downwardly from the impact portion of the auxiliary bumper and having its lowermost portion secured to the face bar.

2. In an auxiliary bumper for motor vehicles, the combination with a vehicle bumper comprising a face bar and arms attaching the end portions of the face bar to a vehicle frame, and a guard member upwardly projecting from said face bar, of an auxiliary bumper comprising a rod terminally mounted on said arms and having its mid portion normally rearwardly spaced from the guard member.

3. The combination with a motor vehicle bumper comprising a face bar and two pairs of arms attaching such bar to a motor vehicle frame, the arms of each pair engaging the face bar at spaced points thereof and converging as they approach the frame, and a guard member upwardly projecting from the face bar, of an auxiliary bumper comprising a rod having its mid portion spaced from said guard in the direction of normal impact, and means for securing the respective ends of said rod between the arms supporting the respective ends of the face bar.

4. The combination set forth in claim 3, said securing means including members engaging beneath and bridged across the paired arms.

5. The combination set forth in claim 3, the ends of said rod exerting a spreading effect on the paired arms, in exercising its bumper function, the means securing said ends to the arms being adapted to resist such spreading effect.

6. The combination set forth in claim 3, said securing means including members engaging beneath and bridged across the paired arms and flanged to straddle the arms to resist a spreading effect exercised by the rod ends, under impact.

7. In an auxiliary bumper construction for a motor vehicle, the combination with the frame of such vehicle, a bumper carried by the frame and having a face bar, and a guard member upstanding from the mid portion of the face bar and having a free upper end portion, of an auxiliary bumper mounted on the frame and projecting therefrom toward the upper portion of the guard member and spaced from said portion in the direction of normal impact, whereby said auxiliary bumper is engageable by the guard, upon deflection of the latter toward the frame, to limit such deflection.

8. In an auxiliary bumper construction for a motor vehicle, the combination with the frame of such vehicle, a bumper carried by the frame and having a face bar, and a guard member upstanding from the face bar and having a free upper end portion, of an auxiliary bumper mounted on the frame and projecting therefrom toward the upper portion of the guard member, and engageable by said portion, upon deflection thereof toward the frame, to limit such deflection, said auxiliary bumper being spaced in its entirety from the guard member in the direction of normal impact, whereby the force of such impact is transmitted to the auxiliary bumper only when the impact is of considerable force.

9. In an auxiliary bumper construction for a motor vehicle, the combination with the frame of such vehicle, a bumper carried by the frame and having a face bar, and a guard member upstanding from the mid portion of the face bar and having a free upper end portion, of an auxiliary bumper comprising a rod rearwardly spaced, at its mid portion from the upper portion of the guard member, and extending downwardly and rearwardly, in an approximate V form, from its mid portion toward the frame, and means terminally securing such rod to the frame.

10. In an auxiliary bumper construction for a motor vehicle, the combination with the frame of such vehicle, a bumper carried by the frame and having a face bar, and a guard member upstanding from the mid portion of the face bar, and having a free upper end portion, of an auxiliary bumper comprising a rod spaced at its mid portion from the upper portion of the guard member in the direction of normal impact, and extending in an approximate V form, from its mid portion toward the frame, means terminally securing such rod to the frame, and a member extending downwardly from the mid portion of said rod and secured to the face bar.

11. In an auxiliary bumper construction for a motor vehicle, the combination with the frame of such vehicle, a bumper carried by the frame and having a face bar, and a guard member upstanding from the face bar, of an auxiliary bumper mounted on and projecting from the frame and spaced from the upper portion of the guard member in the direction of normal impact, and a tie member pivoted on and extending downwardly from the impact-receiving portion of the auxiliary bumper and secured to the face bar, whereby a part of the force of an impact is transmitted to the auxiliary bumper only when such force is considerable.

12. A motor vehicle bumper comprising a face bar, two pairs of arms attaching such face bar to a motor vehicle frame, the arms of each pair engaging the face bar at spaced points thereof and converging as they approach the frame, and an auxiliary bumper having its mid portion spaced in the direction of normal impact from said face bar, and limiting the movement of the face bar toward the frame, under impact, and means for securing the respective ends of the auxiliary bumper between the arms supporting the respective ends of the face bar.

13. The combination with a motor vehicle bumper comprising a face bar and a guard member upstanding therefrom, of an auxiliary bumper pivoted at its mid portion to means connected with the upstanding guard member and extending therefrom in the approximate direction of normal impact.

14. In an auxiliary bumper for a motor vehicle, the combination with the frame of such vehicle, a bumper carried by the frame and having a face bar, and a guard member upstanding from the face bar, of an auxiliary bumper mounted on and forwardly projecting from the frame and spaced from the guard member in the direction of normal impact, and engageable by the guard member upon deflection thereof toward the frame, to limit such deflection, a member downwardly extending from the impact portion of the auxiliary bumper, and a common means securing the guard member and said downwardly extending member to the face bar.

15. A motor vehicle bumper comprising a face bar, two pairs of arms attaching such face bar to a motor vehicle frame, the arms of each pair engaging the face bar at spaced points thereof and converging as they approach the frame, a guard member secured to and upstanding upon the face bar, and an auxiliary bumper having its mid portion in impact receiving relation to the upstanding portion of the guard member, and means for securing the respective ends of the auxiliary bumper between the arms supporting the respective ends of the face bar.

16. In a vehicle bumper construction, the combination with a bumper face bar, a pair of arms attaching an end portion of such bar to a vehicle frame and converging toward the frame, and a guard member upwardly projecting from the face bar, of an auxiliary bumper occupying a reinforcing proximity to the upper portion of the guard member, means connecting the auxiliary bumper to the guard member, and means securing the auxiliary bumper between the paired arms in proximity to the frame, such means including a member engaging beneath and bridged across such arms.

WILLIAM A. TAYLOR.